United States Patent
Tanahashi et al.

(10) Patent No.: US 6,511,761 B1
(45) Date of Patent: Jan. 28, 2003

(54) MAGNETIC RECORDING MEDIA AND MAGNETIC STORAGE APPARATUS

(75) Inventors: Kiwamu Tanahashi, Kokubunji (JP); Tetsuya Kanbe, Odawara (JP); Satoshi Matsunuma, Yawara (JP); Akira Ishikawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 172 days.

(21) Appl. No.: 09/663,204

(22) Filed: Sep. 18, 2000

(30) Foreign Application Priority Data

Dec. 24, 1999 (JP) .......................... 11-366241

(51) Int. Cl.⁷ .................... H01F 1/01; B32B 15/00; G11B 5/66; G11B 5/70; G11B 5/012
(52) U.S. Cl. ................. 428/694 TS; 428/667; 428/611; 428/694 TM; 428/900; 360/97.01
(58) Field of Search ............... 428/694 TS, 694 TM, 428/900, 611, 667; 360/97.01

(56) References Cited

U.S. PATENT DOCUMENTS 6,248,416 B1 * 6/2001 Lambeth et al. ........... 428/65.3

FOREIGN PATENT DOCUMENTS

JP 62-257617 11/1987
JP 10-325394 * 11/1998

* cited by examiner

Primary Examiner—Holly C. Rickman
(74) Attorney, Agent, or Firm—Mattingly, Stanger & Malur, P.C.

(57) ABSTRACT

In a magnetic storage apparatus including a recording medium having a magnetic layer, a seed layer and an underlayer formed on a substrate, a driver for driving the recording medium, a magnetic head having an inductive recording head and a magnetoresistive reproducing head, and a signal processing system for processing input signals to the magnetic head and output signals from the magnetic head, the seed layer comprises an amorphous alloy or a microcrystal alloy containing Ni, Ta and Zr, the underlayer comprises an alloy containing Cr as a main component and Ti, and the magnetic layer has a first magnetic layer in contact with the underlayer and a second magnetic layer on the first magnetic layer. The first magnetic layer comprises a Co—Cr—Pt alloy and the second magnetic layer comprises Co—Cr—Pt—B alloy, both of a substantially hexagonal close-packed structure.

12 Claims, 7 Drawing Sheets

MAGNETIC RECORDING MEDIA AND MAGNETIC STORAGE APPARATUS

BACKGROUND OF THE INVENTION

This invention relates to a magnetic storage apparatus and magnetic recording media and, more in particular, it relates to a magnetic storage apparatus having an areal recording density of 10 Gbits or more per square inch and magnetic recording media for providing the same.

In recent years, amount of information processed in computers has been increased more and more and greater capacity and higher speed transfer have been demanded for a magnetic disk apparatus as an external storage device. At present, magnetic disk apparatus having a recording density in the order of 4 Gbit per one square inch at the maximum have been put into practical products. For a magnetic head in such high density magnetic disk apparatus, a composite type head of separating a recording portion and a reproducing portion and using an inductive head for the recording portion and a magnetoresistive head for the reproducing portion has been adopted.

Since the magnetoresistive head is highly sensitive not only to signals but also noises of media, lowering of noises has been demanded more for the magnetic recording media than usual. Medium noises in the longitudinal magnetic recording system are mainly caused by disorder of magnetization in a magnetization transition region between recorded bits and narrowing of the region leads to the lowering of the medium noises. For this purpose, it is effective to decrease the magnetization reversal size by decreasing the size of magnetic grains and weakening the intergranular interaction. The magnetic grains can be made fine decreasing the size of by refining underlying grains by utilizing an epitaxial relation between a magnetic layer and an underlayer. Further, the intergranular interaction can be weakened by segregating non-magnetic Cr to the grain boundary and, for promoting the segregation of Cr, studies have been made for CoCrPt alloys at high Cr concentration, CoCrPtTa alloys and CoCrPtB alloys.

For coping with linear recording density increasing year by year, it is necessary to make the coercivity (Hc) of magnetic recording media higher. It is necessary to increase the Pt concentration in order to obtain high Hc in a CoCrPt alloy at high Cr concentration, but the overwrite characteristics tend to lower abruptly as the Pt concentration increases. On the other hand, in the CoCrPtTa alloy, since grain boundary segregation of Cr occurs even when the Cr concentration is not so high and magnetic grains show high magnetic isolation, high Hc can be obtained at a relatively low Pt concentration. However, also in the case of using the CoCrPtTa alloy, the Cr concentration has to be increased for further decreasing medium noises and the Pt concentration has to be increased in order to ensure high Hc with finer grain size. However, in the CoCrPtTa alloy, epitaxial growth of the underlayer and the magnetic layer is difficult at composition of high Cr concentration, and Pt concentration to result in a problem that no sufficient magnetic characteristics and read/write characteristics can be obtained. Such a problem is also observed in a case of using a CoCrPtB alloy magnetic layer with high Pt concentration.

This invention has been made in order to solve the foregoing subject. More specifically, this invention intends to provide magnetic storage apparatus having high S/N ratio at a recording density of 10 Gbits or more per square inch and excellent in the reliability.

SUMMARY OF THE INVENTION

The foregoing object can be attained in accordance with this invention in a magnetic storage apparatus including a magnetic recording medium having, on a substrate, a seed layer, one or plurality of underlayers formed on the seed layer and one or plurality of magnetic layers formed on the underlayer, a driver for driving the medium in the recording direction, a read/write separation type magnetic head having an inductive head for recording and a magnetoresistive head for reproducing in combination, a means for moving the magnetic head relative to the magnetic recording medium and a read/write signal processing means for processing input signals to the magnetic head and output signals from the magnetic head wherein, in the magnetic recording medium, the seed layer comprises an amorphous alloy or a microcrystal alloy containing Ni, Ta and Zr, one or plurality of underlayers comprises an alloy containing Cr as a main ingredient and containing Ti and one or plurality of magnetic layers comprise a first magnetic layer in contact with the underlayer and a second magnetic layer formed on the first magnetic layer, and the first magnetic layer comprises a Co—Cr—Pt alloy having a substantially HCP structure and the second magnetic layer comprises a Co—Cr—Pt—B alloy or Co—Cr—Pt—Ta alloy having a substantially HCP structure.

The underlayer of the magnetic recording medium serves to orient the C axis of the magnetic layer using the Co alloy substantially of the HCP structure within a plane of film and decrease the grain size of the magnetic layer. When a CoCrPt alloy at high Pt concentration is used for the magnetic layer, since customarily used Cr underlayer causes a problem in the lattice matching, it is effective to use a Cr—Ti alloy substantially of an BCC structure as disclosed in Japanese Patent Laid-open No. Sho 62-257617. Since the Cr—Ti alloy has a larger lattice spacing compared with Cr, it has favorable lattice matching with the CoCrPt alloy at high Pt concentration and the grain size can be decreased.

However, as the Ti concentration increases, this involves a problem of weakening (001) orientation which is a desired crystallographic orientation for the underlayer. The present inventors have studied on various materials as a seed layer formed between the substrate and the underlayer and have found that, when an NiTaZr alloy is used as the seed layer, (001) orientation in the CrTi alloy underlayer is increased and the grain size in the underlayer can be made smaller. Since the NiTaZr alloy shows no distinct diffraction peak in X-ray-diffraction and shows neither distinct diffraction spot nor diffraction ring also in electron diffraction, it is considered that the alloy is in an amorphous or microcrystal form. For the composition of the NiTaZr alloy, it is desirable that the Ta concentration is 30 at % or more and 60 at % or less and the Zr concentration is 5 at % or more and 20 at % or less. If the Ta concentration is out of the range described above, it is not desirable since crystallization of the NiTaZr alloy sometimes occurs depending on the film deposition condition and (001) orientation of the CrTi alloy underlayer is deteriorated. Further, if the Zr concentration decreases to 5 at % or less, although the CrTi alloy underlayer has strong (001) orientation, the grain size of the underlayer is increased. On the other hand, if it is 20 at % or more, (001) orientation is undesirably degraded.

The magnetic layer of the magnetic recording medium is constituted with a first magnetic layer in contact with the underlayer and a second magnetic layer formed on the first magnetic layer, in which a CoCrPt alloy can be used as the material for the first magnetic layer and a CoCrPtTa alloy or CoCrPtB alloy can be used as the material for the second magnetic layer. Particularly, the CoCrPtB alloy tends to give a high Hc even if the grain size is small, which is desirable in view of improving the output resolution. Further, as the second magnetic layer, a magnetic layer of a so-called granular structure comprising a Co—Pt alloy of high magnetic anisotropy and an oxide ($SiO_2$, $Al_2O_3$, etc) can be used. Use of the single layer of the CoCrPt alloy for the magnetic alloy is not preferred since the overwrite characteristics tend to be deteriorated with a composition at high Pt concentration.

When an intermediate layer comprising a CrMo alloy is formed between the magnetic layer and the underlayer, a single layer of a CoCrPtTa alloy or CoCrPtB alloy can be used as the magnetic layer. Further, it is also possible to use a magnetic layer of the granular structure comprising a CoPt alloy and an oxide. Particularly, use of the single layer of the CoCrPtB alloy tends to give fine grain size and high Hc simultaneously and low medium noise and high resolution performance can be attained desirably. When a CoCrPtTa alloy or CoCrPtB alloy magnetic layer is formed directly on the CrTi alloy underlayer, epitaxial growth is difficult in a composition region in which the Cr and the Pt concentrations are high. However, the C axis of the CoCrPtTa alloy or CoCrPtB alloy magnetic layer can be oriented in-plane by using the CrMo alloy intermediate layer. Since the CrMo alloy is a complete series of solid solution, lattice matching with the CoCrPtTa alloy or CoCrPtB alloy magnetic layer can be enhanced by controlling the concentration of Mo having larger atomic radius compared with Cr. Further, since the grain size of the CrMo alloy tends to increase with the thickness, it has to be used within a range of a reduced thickness. The thickness of the intermediate CrMo alloy layer is preferably from 3 nm or more and 10 nm or less for keeping good crystallographic orientation and suppressing the growth of the crystal grain.

It is necessary to use a substrate of excellent surface smoothness and, specifically, an Al—Mg substrate having NiP formed on the surface, glass substrate, $SiO_2$ substrate, SiC substrate and carbon substrate can be used. The Al—Mg substrate is usually applied with texturing on the surface and provided with the magnetic anisotropy in the circumferential direction of the substrate. In a substrate for which application of mechanical texturing is difficult such as a glass substrate, the magnetic anisotropy can also be provided in the circumferential direction of the substrate by applying slight texturing of about Ra=1 nm after forming a seed layer. As the protection film for the magnetic layer, a film mainly composed of carbon as a main ingredient at a thickness of. the 3 nm or more and 12 nm or less is formed, and a lubrication layer such as of perfluoroalkyl polyether or the like is formed at a thickness of 1 nm or more and 10 nm or less, to obtain highly reliable magnetic recording medium.

A magnetoresistive sensor of a magnetoresistive head for reproducing used in the magnetic storage apparatus according to this invention is formed preferably between two shield layers made of a soft magnetic material spaced apart from each other at a distance of 0.12 μm or more and 0.18 μm or less. If the distance between the shield layers is larger than 0.18 μm, it is not preferred since the resolution is lowered. On the other hand, if it is smaller than 0.12 μm, it is not preferred since the insulation property between the shield layer and the magnetoresistive sensor may possibly be degraded. Further, when the magnetoresistive head is constituted with a plurality of conductive magnetic layers of causing great resistance change by relative change of the magnetization direction to each other by external magnetic fields and a magnetoresistive sensor including a conductive non-magnetic layer disposed between the conductive magnetic layers, the reproducing signal can be increased and a magnetic storage apparatus of high reliability at a recording density of 10 Gbits or more per one square inch can be obtained.

DETAILED DESCRIPTION OF THE INVENTION

Embodiment 1

Figure 1:
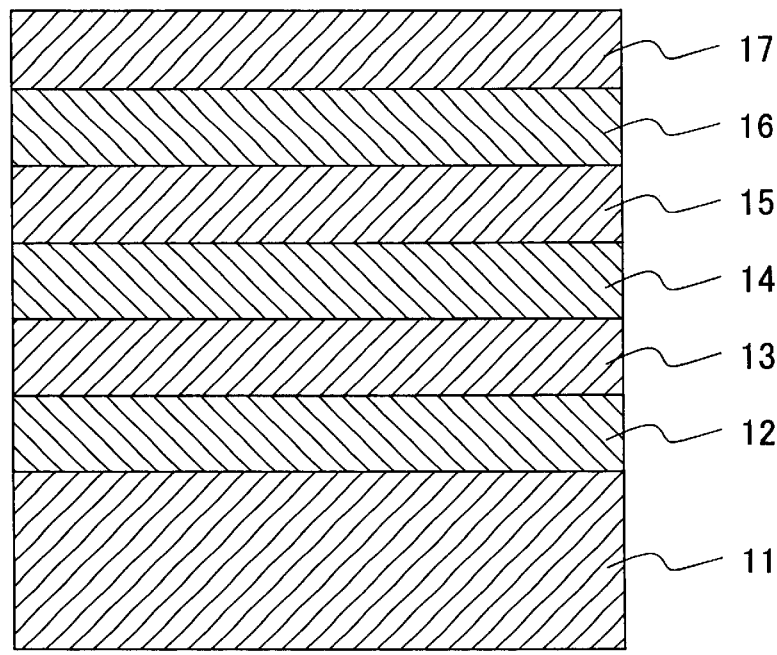
FIG. 1 is a view illustrating a layered structure of a magnetic recording medium as an embodiment according to this invention.
Figure 2:
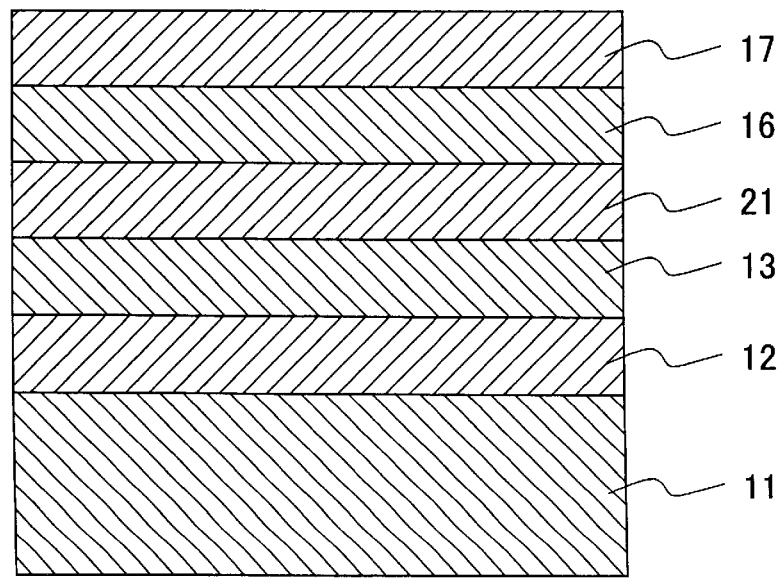
FIG. 2 is a view illustrating a layered structure of a magnetic recording medium as a reference embodiment to this invention.

FIG. 1 illustrates a layered structure of a magnetic recording medium in this embodiment. Respective layers were formed by using a 2.5 inch size chemically reinforced alkali cleaned soda lime glass disk for a substrate 11, an Ni-37.5 at % Ta-10 at % Zr alloy layer of 50 nm thickness for a seed layer 12, a Cr-20 at % Ti alloy layer of 30 nm thickness for an underlayer 13, a Co-22 at % Cr-14 at % Pt alloy layer of 10 nm thickness for a first magnetic layer 14, a Co-21 at % Cr-12 at % Pt-3 at % Ta alloy layer of 10 nm thickness for a second magnetic layer 15, and a carbon layer of 6 nm thickness for a protection layer 16, successively, by DC magnetron sputtering. Films were formed under the condition at an argon gas partial pressure of 5 mTorr and the substrate was heated to a temperature of 270° C. by a lamp heater after forming the seed layer 12. As the lubrication layer 17, a perfluoroalkyl polyether type material diluted with a fluorocarbon material was coated. As Reference 1, a medium using an Ni-37.5 at % Ta alloy layer of 50 nm thickness for the seed layer 12 was prepared and, as Reference 2, a medium using Co-22 at % Cr-14 at % Pt alloy layer of 18 nm thickness for the single magnetic layer 21 as shown in FIG. 2 was prepared.

Table 1 shows the values for the coercivity and coercivity squareness measured in the running direction of the magnetic head for two media, and read/write characteristics at a linear recording density of 400 kFCI.

TABLE 1

| characteristic | Hc [kOe] | S* | Slf/N [dB] | Output resolution [%] | Overwrite [dB] |
|---|---|---|---|---|---|
| Embodiment 1 | 2.95 | 0.73 | 31.4 | 55.0 | 37.7 |
| Reference 1 | 3.25 | 0.76 | 27.6 | 54.7 | 36.1 |
| Reference 2 | 3.14 | 0.75 | 28.3 | 55.3 | 29.8 |
| Embodiment 2 | 2.92 | 0.72 | 32.5 | 54.8 | 37.9 |
| Reference 3 | 0.51 | 0.02 | — | — | — |

For the evaluation of read/write characteristics, magnetic heads each comprising a spin-valve reproducing device with a distance between shield layers of 0.15 $\mu$m and a inductive recording device of 0.23 $\mu$m gap length were used. Slf represents the output of isolated reproducing wave and N represents a medium noise at a linear recording density of 400 kFCI, and the medium S/N was evaluated as the ratio Slf/N. The output resolution was indicated as a value obtained by dividing a read output at 200 kFCI with a read output at 25 kFCI as a percentage. Further, as the overwrite characteristics, the residual intensity after erasing of 1f signals was evaluated after reading 1f signals (47.5 kFCI) and overwriting 2f signals (400 kFCI) . For the magnetic properties of the media of Embodiment 1 and References 1 and 2, substantially equal values were obtained as HC of about 3 kOe and S* of about 0.75. While the read/write characteristics of the medium of Embodiment 1 were comparable with those of the medium of Reference 1 regarding the output resolution, Slf/N was favorable being higher by 3.8 dB. The medium of Reference 2 could provide a high output resolution of 55.3% but Slf/N was lower by 3.1 dB compared with the medium of Embodiment 1 and, further, the overwrite characteristics were 29.8 dB, which were remarkably lower than 36 dB required practically.

To investigate the reason for the difference of the Slf/N between Embodiment 1 and Reference 1, crystallographic orientation was examined by X-ray diffraction.

X-ray diffraction was conducted by using an X-ray diffraction apparatus having Cu as a target (RINT: manufactured by Rigaku). K $\alpha$ rays were used as an X-ray source. Measurement was conducted under the condition of using a $\theta$–2 $\theta$ method and at an applied voltage of 40 kV and an applied current of 100 mA.

Figure 3:
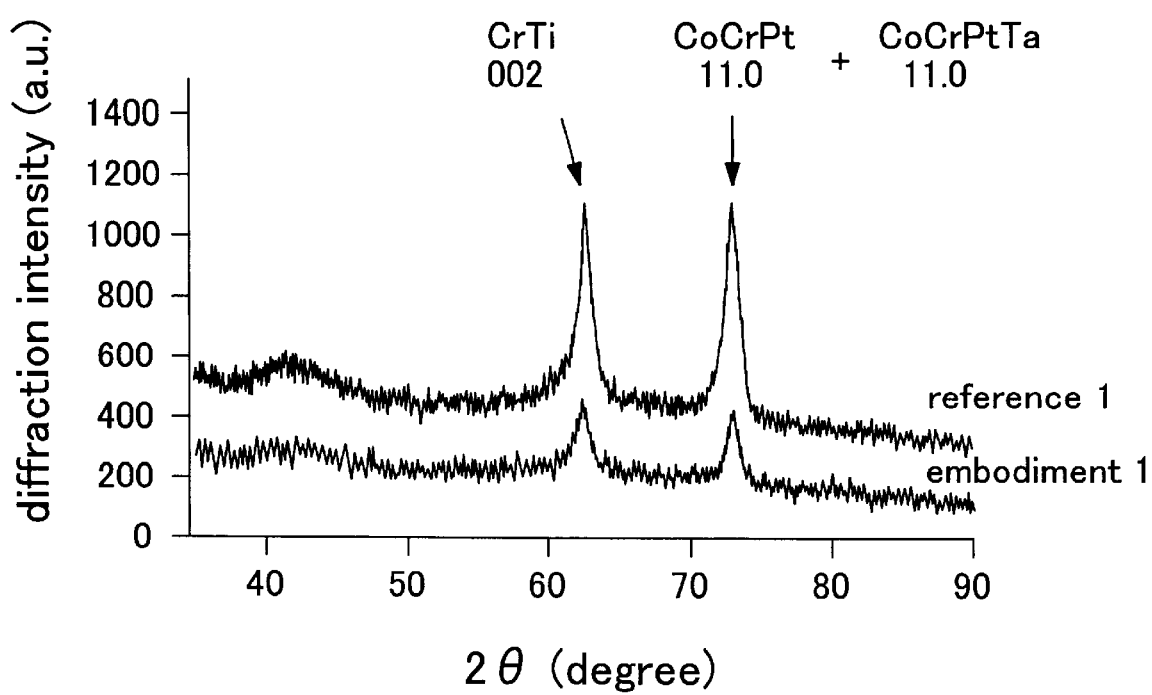
FIG. 3 is a diagram illustrating an X-ray diffraction pattern for magnetic recording media of Embodiment 1 and Reference 1.

FIG. 3 shows an X-ray diffraction pattern for media. For both of the media, only the 002 diffraction peak of the underlayer and 11.0 diffraction peak of the HCP structure of the magnetic layer were observed and no diffraction peak from the seed layer was recognized. Since the diffraction peak from the seed layer was not found although the thickness was relatively thick as 50 nm, it is considered that the Ni-37.5 at % Ta-10 at % Zr alloy and the Ni-37.5 at % Ta alloy form amorphous states or micro fine crystals. The underlayer formed on the seed layer had (001) orientation in both of the media but the 002 diffraction peak intensity in the media of Reference 1 is greater by three times or more compared with that of the medium of Embodiment 1. When the surface morphology of the underlayer in both of the media was observed by an atomic force microscope, roughness of about 12 nm of period was observed in the medium of Embodiment 1, whereas roughness of about 16 nm of period was observed in the medium of Reference 1. Since it is considered that the period of the roughness substantially corresponds to the size of the crystal grains, it can be seen that the grain size is increased for the underlayer in the medium of Reference 1. That is, when the NiTa alloy is used for the seed layer, while strong (001) orientation is obtained for the underlayer, the grain size in the underlayer increases failing to obtain microfine magnetic grains. On the contrary, increase of the grain size in the underlayer can be suppressed while keeping the (001) orientation in the underlayer by using the NiTaZr alloy for the seed layer and, as the result, the small magnetic grains are obtained. Accordingly, it is considered that the Slf/N in the medium of Embodiment 1 is higher by 3.8 dB compared with that in the medium of Reference 1 mainly because of the decrease of the magnetic grain size.

Figure 4A:
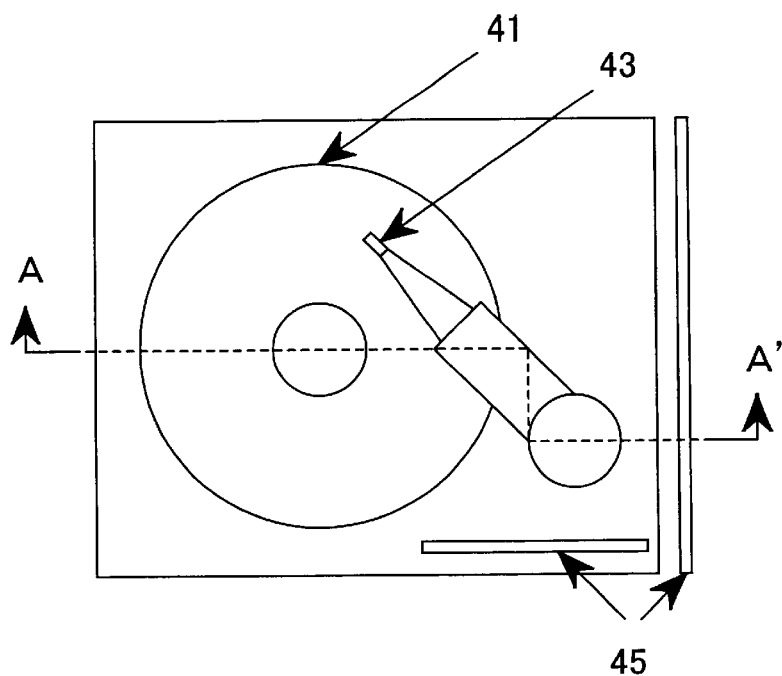
FIGS. 4(a) and 4(b) are schematic plan views and vertical cross sectional views taken along line A–A' thereof, respectively, for a magnetic storage apparatus as an embodiment according to this invention.
Figure 4B:
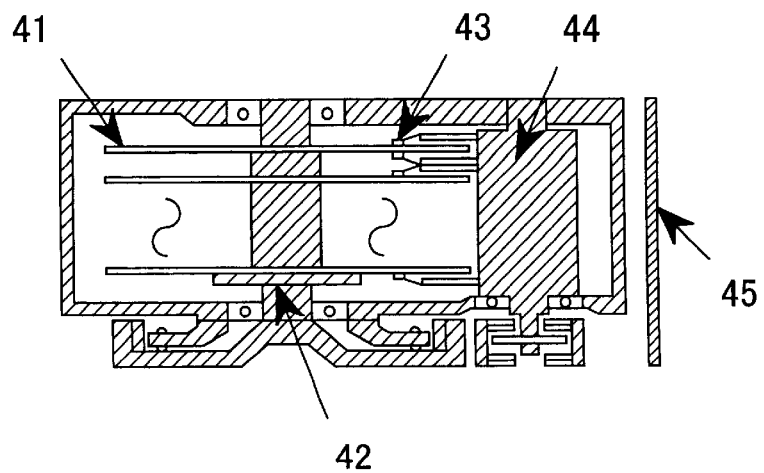
Figure 5:
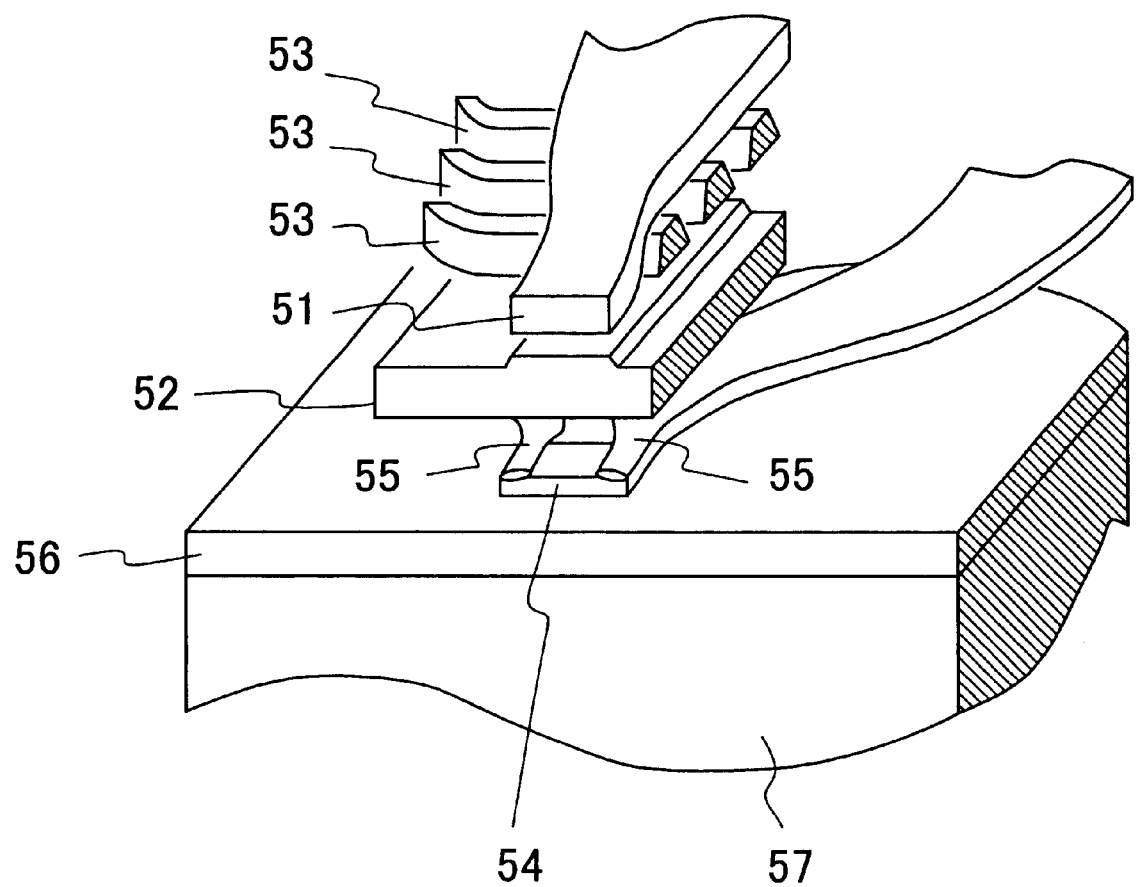
FIG. 5 is a schematic perspective view illustrating a cross sectional structure of a magnetic head in a magnetic storage apparatus according to this invention.

FIG. 4(a) and FIG. 4(b) show a schematic plan view and a schematic vertical cross sectional view of a magnetic storage apparatus of this embodiment. This is a magnetic storage apparatus having a well-known constitution comprising a magnetic recording medium 41, a driver 42 for rotationally driving the medium, a magnetic head 43 and a driving unit 44 therefor and a read/write signal processing system 45 for the magnetic head. FIG. 5 schematically shows the structure of a magnetic head used for the magnetic storage apparatus. The magnetic head is a read/write separation type head having an inductive head for recording and a magnetoresistive head for reproducing formed in combination on a magnetic head slider substrate 57. The recording magnetic head is a thin layer inductive magnetic head comprising a pair of recording poles 51, 52 and coils 53 crossing therewith in which the gap layer thickness between the recording magnetic poles is defined as 0.23 $\mu$m. The magnetic pole 52 is paired with a magnetic shield layer 56 also of 1 $\mu$m thickness and serves also as a magnetic shield for the reproducing magnetic head with the distance between the shield layers of 0.15 $\mu$m. The reproducing magnetic head is a magnetoresistive head comprising a magnetoresistive sensor 54 and a conductor layer 55 as an electrode. The gap layer and the shield layer between the recording magnetic poles are not illustrated in FIG. 5.

Figure 6:
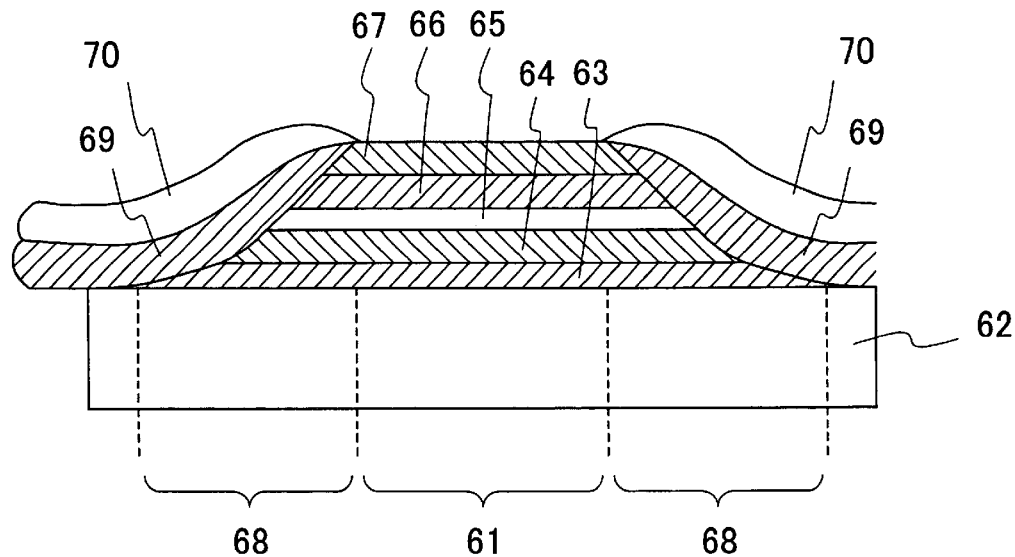
FIG. 6 is a schematic view for a vertical cross sectional structure of a magnetoresistive sensor for a magnetic head in a magnetic storage apparatus according to this invention.

FIG. 6 shows a vertical cross sectional structure of a magnetoresistive sensor. A signal sensing region 61 of the magnetic sensor has a structure in which a Ta buffer layer 63 of 5 nm thickness, a first magnetic layer 64 of 7 nm thickness, an intermediate Cu layer 65 of 1.5 nm thickness, a second magnetic layer 66 of 3 nm thickness, and an anti-ferromagnetic Fe-20 at % Mn alloy layer 67 of 10 nm thickness are formed successively on a gap layer 62 of Al oxide. An Ni-20 at % Fe alloy was used for the first magnetic layer 64 and Co was used for the second magnetic layer 66. Magnetization of the second magnetic layer 66 is fixed in one direction by exchange fields from the anti-ferromagnetic alloy 67. On the contrary, the direction of magnetization of the first magnetic layer 64 in contact with the second magnetic layer 66 by way of a non-magnetic intermediate layer 65 changes depending on leakage fields from the magnetic recording medium. Resistance for the entire film of the three layers is changed depending on the change of the relative direction of magnetization in the two magnetic layers. This phenomenon is referred to as a spin-valve effect. Both ends of the signal sensing region 61 are formed as a tapered portion 68 fabricated into a tapered shape. The tapered portion 68 comprises a permanent magnet layer 69 and a pair of electrodes 70 formed thereon for taking out signals. It is important for the permanent magnet 69 that it has high coercivity and does not easily change the direction of magnetization, for which CoCr or CoCrPt alloy is used.

When the medium of Embodiment 1 was incorporated into the magnetic storage apparatus described above and the read/write characteristics were evaluated under the condition at a head flying height of 15 nm, a linear recording density of 425 kFCI, and a track density of 25 kTPI, the medium sufficiently satisfied the specification for the read/write characteristics of areal recording density of 10 Gbits per square inch, within a temperature range from 10° C. to 50° C. In addition, the number of bit errors after 50,000 cycles of a head seek test from the inner circumference to the outer circumference was 10 bit/plane or less and it could attain 300,000 hours for the mean time between failures.

Embodiment 2

Figure 7:
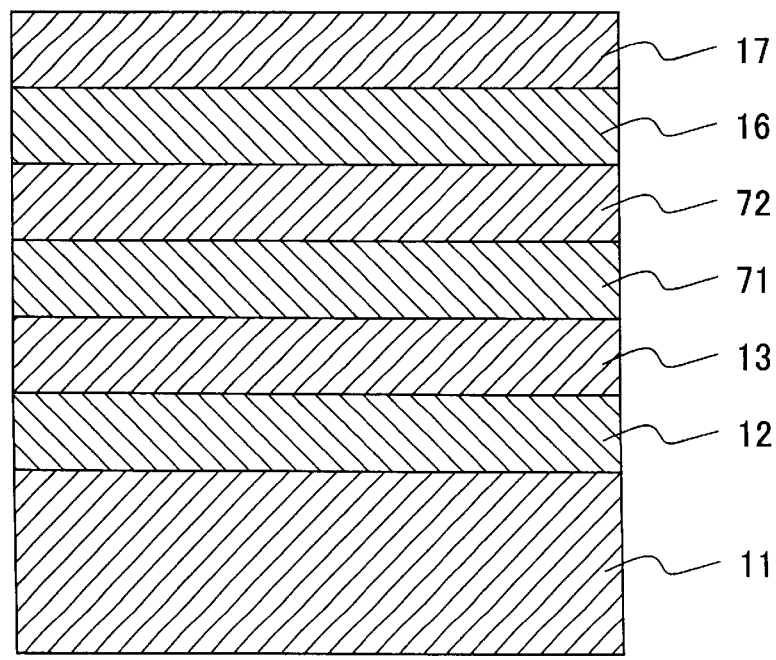
FIG. 7 is a view illustrating a layered structure of a magnetic recording medium as an embodiment according to this invention.
Figure 8:
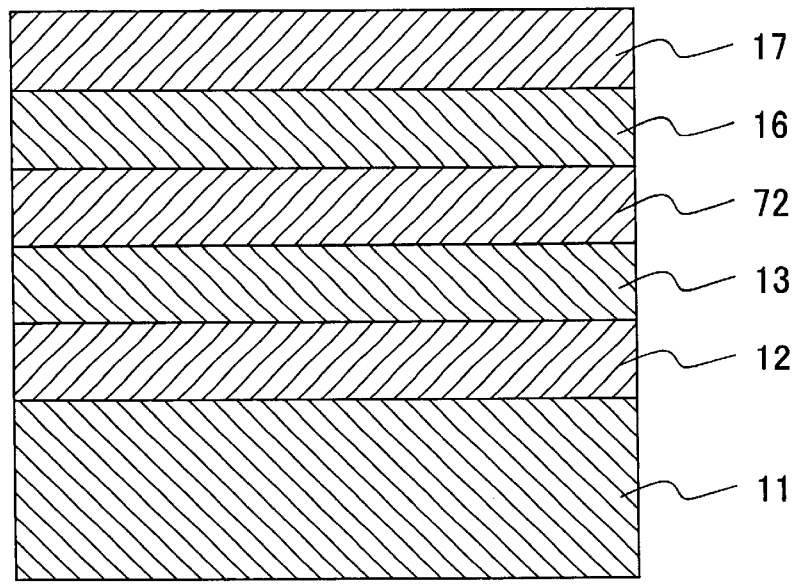
FIG. 8 is a view illustrating a layered structure of a magnetic recording medium as a reference embodiment to this invention.

FIG. 7 shows a layered structure of a magnetic recording medium used in this embodiment. A Cr-40 at % Mo alloy of 5 nm thickness was used as an intermediate layer 71, a Co-21 at % Cr-13 at % Pt-4 at % B alloy of 18 nm thickness was used as a magnetic layer 72 and other layers and film deposition conditions were identical with those for the medium of Embodiment 1. Further, as Reference 3, a medium having a magnetic layer 72 formed directly on an underlayer 13 was prepared as shown in FIG. 8.

Figure 9:
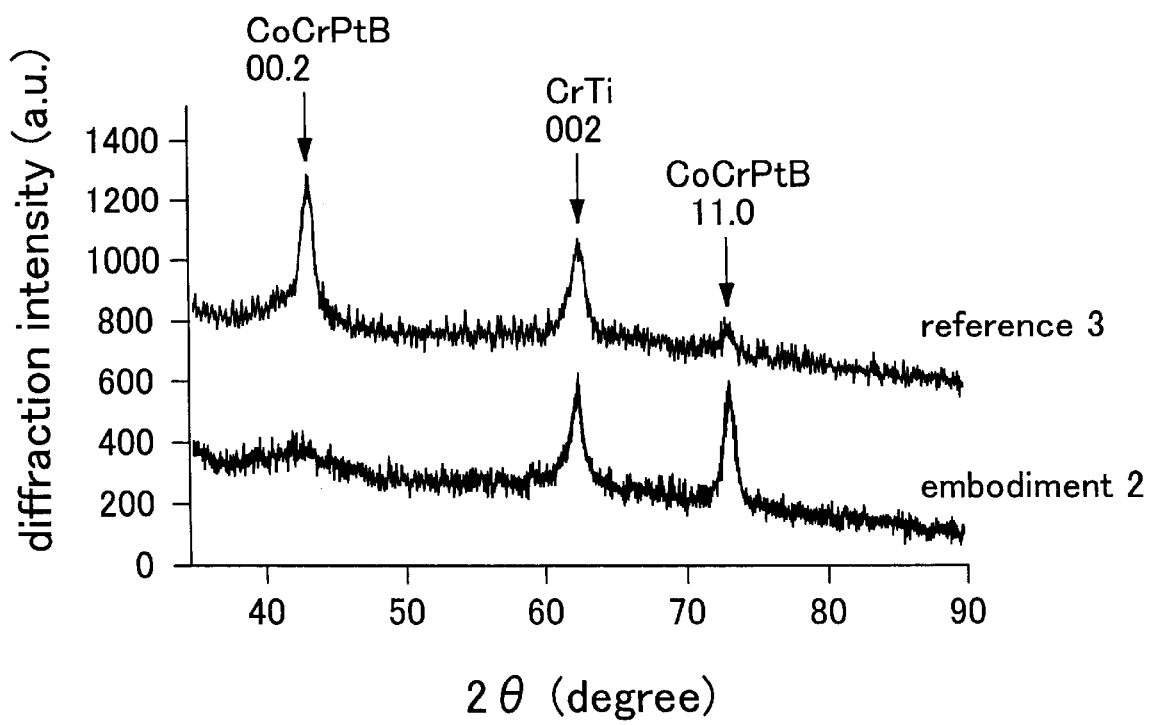
FIG. 9 is a diagram illustrating an X-ray diffraction pattern for a magnetic recording media of Embodiment 2 and Reference 3.

Table 1 shows the values for the coercivity and coercivity squareness measured in the running direction of the magnetic head, and read/write characteristics at a linear recording density of 400 kFCI in the media of Embodiment 2 and Reference 3. For the medium of Embodiment 2, static magnetic properties comparable with those in the medium of Embodiment 1 were obtained and a value for Slf/N as high as 32.5 dB was obtained as the read/write characteristics. On the other hand, for the medium of Reference 3, no sufficient magnetic properties were obtained for the evaluation of read/write characteristics, as Hc of 0.51 kOe and S* of 0.02. FIG. 9 shows an X-ray diffraction pattern for the media of Embodiment 2 and Reference 3. The measuring conditions for the X-ray diffraction were identical with those of Embodiment 1.

In the medium of Embodiment 2, the diffraction peak can not be confirmed for the intermediate layer 71 since the thickness is as thin as 5 nm. However, since 11.0 diffraction peak of the HCP structure from the magnetic layer 72 is observed, it can be seen that the underlayer 13 and the intermediate layer 71 have (001) orientation, on which the magnetic layer has (11.0) orientation by epitaxial growth. On the other hand, for the medium of Reference 3, 00.2 diffraction peak of the HCP structure from the magnetic layer 72 is observed, showing that the C axis of the magnetic layer is vertically oriented relative to the substrate. As described above, the Cr-40 at % Mo alloy used as the intermediate layer 71 in the medium of Embodiment 2 serves to orient the C-axis of the magnetic layer 72 in-plane to improve the static magnetic properties.

When the medium of Embodiment 2 was incorporated into the magnetic storage apparatus of Embodiment 1 and evaluated for the read/write characteristics under the conditions at a head flying height of 15 nm, a linear recording density of 425 kFCI and a track density of 25 kTPI, the medium sufficiently satisfied the specification for the read/write characteristics of areal recording density at 10 Gbits per one square inch within a temperature range from 10° C. to 50° C. In addition, the number of bit errors after 50,000 cycles of a head seek test from the inner circumference to the outer circumference was 10 bit/plane or less and it could attain 300,000 hours for the mean time between failures.

Embodiment 3

Figure 10:
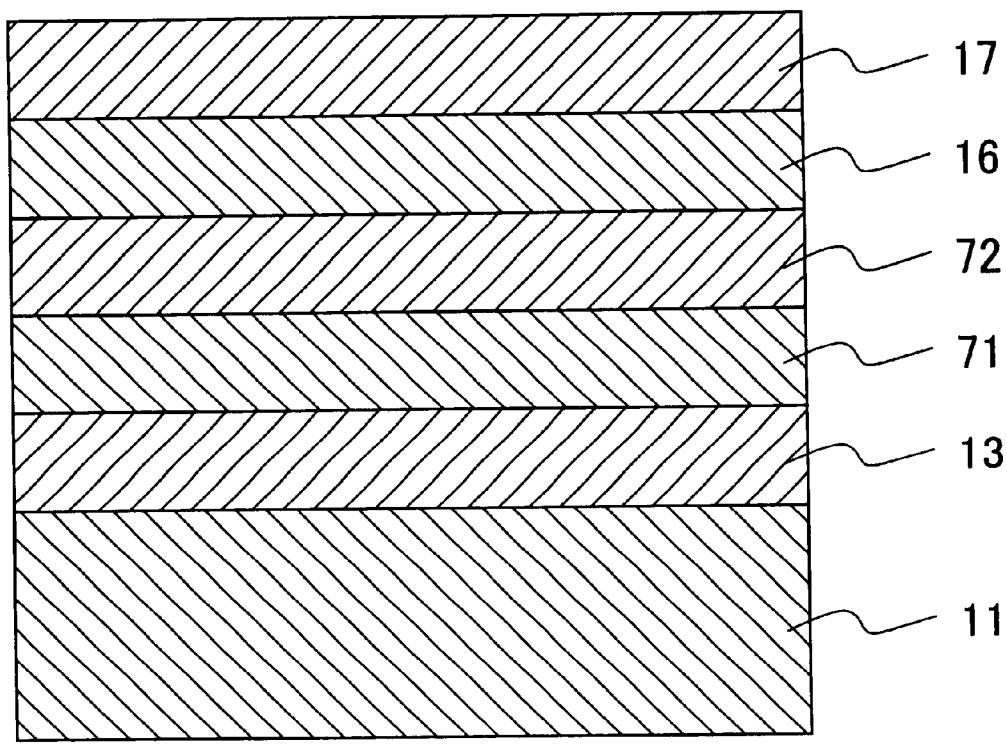
FIG. 10 is a view illustrating a layered structure of a magnetic storage medium of a reference embodiment to this invention.

A medium was fabricated in the same layer structure as that for the medium of Embodiment 2, by using a 2.5 inch size NiP plated Al—Mg alloy substrate for the substrate 11. The substrate 11 was applied with texturing of Ra=3 nm. The film deposition conditions and the lubrication layer 17 are identical with those in the medium of Embodiment 1. Further, as Reference 4, a medium having an underlayer 13 formed directly on the substrate 11 as shown in FIG. 10 was prepared. Table 2 shows the value for coercivity and coercivity squareness measured in the running direction of the magnetic head for the media of Embodiment 3 and Reference 4, and read/write characteristics at a linear recording density of 400 kFCI.

TABLE 2

| characteristic | Hc [kOe] | S* | Slf/N [dB] | Output resolution [%] | Overwrite [dB] |
|---|---|---|---|---|---|
| Embodiment 3 | 3.24 (2.85) | 0.78 (0.60) | 29.2 | 56.6 | 37.5 |
| Reference 4 | 3.01 (2.90) | 0.70 (0.66) | 29.3 | 52.9 | 37.3 |
| Embodiment 4 | 3.12 (2.74) | 0.76 (0.61) | 31.9 | 55.9 | 37.2 |

*Values indicated in parentheses represent values measured in the direction perpendicular to the running direction of the magnetic head.

Values for Hc and S* indicated in parentheses are values measured in the direction perpendicular to the running direction of the magnetic head. For the medium of Embodiment 3, magnetic anisotropy was provided in the running direction of the magnetic head, and Hc and S* were increased by 0.23 kOe and 0.08 (, respectively,) compared with the medium of Reference 4. This is considered due to the fact that the (001) orientation of the underlayer 13 and the (11.0) orientation of the magnetic layer were strengthened by forming the seed layer 12, and the effect of providing the magnetic anisotropy by texturing was improved. This could provide the output resolution at a value higher by 3.7% compared with the medium of Reference 4.

When the medium of Embodiment 3 was incorporated into the magnetic storage apparatus of Embodiment 1 and evaluated for the read/write characteristics under the conditions at a head flying height of 15 nm, a linear recording density of 425 kFCI and a track density of 25 kTPI, the medium sufficiently satisfied the specification for the read/write characteristics of areal recording density at 10 Gbits per one square inch within a temperature range from 10° C. to 50° C. In addition, the number of bit errors after 50,000 cycles of a head seek test from the inner circumference to the outer circumference was 10 bit/plane or less and it could attain 300,000 hours for the mean time between failures.

Embodiment 4

After forming the seed layer 12 in the same layered structure as in Embodiment 2, the medium was taken out of the film deposition system, applied with texturing of Ra=1 nm and, after cleaning the substrate again, the underlayer 13, the first magnetic layer 14, the second magnetic layer 15 and the protection layer 16 were formed successively. The film deposition conditions and the lubrication layer 17 were identical with those for the medium of Embodiment 1.

Table 2 shows the value for coercivity and coercivity squareness measured in the running direction and the direction perpendicular to the running direction of the magnetic head for the Embodiment 4, and read/write characteristics at a linear recording density of 400 kFCI.

Values for Hc and S* indicated in parentheses were measured in the direction perpendicular to the running direction of the magnetic head. The medium of Embodiment 4 was provided with the magnetic anisotropy in the running direction of the magnetic head and the same static magnetic properties as those in the case of using the NiP plated AlMg alloy substrate applied with texturing (Embodiment 3) were obtained. For the read/write characteristics, while Slf/N was lowered by 0.6 dB, the output resolution was improved by 1.1 point compared with those of the medium of Embodiment 2 of the same layered structure except for the texturing.

When the medium of Embodiment 4 was incorporated into the magnetic storage apparatus of Embodiment 1 and evaluated for the read/write characteristics under the conditions at a head flying height of 15 nm, a linear recording density of 425 kFCI and a track density of 25 kTPI, the medium sufficiently satisfied the specification for the read/write characteristics of plane recording density at 10 Gbits per square inch within a temperature range from 10° C. to 50° C. In addition, the number of bit errors after 50,000 cycles of a head seek test from the inner circumference to the outer circumference was 10 bit/plane or less and it could attain 300,000 hours for the mean time between failures.

According to this invention, a magnetic storage apparatus of excellent reliability having high recording density and with low error rate can be attained.

REFERENCE NUMERALS

11 . . . substrate
12 . . . seed layer
13 . . . underlayer
14 . . . first magnetic layer
15 . . . second magnetic layer
16 . . . protection layer
17 . . . lubrication layer
21 . . . magnetic layer
41 . . . magnetic recording medium
42 . . . magnetic recording medium driver
43 . . . magnetic head
44 . . . magnetic head access system
45 . . . read/write processing system
51 . . . recording magnetic pole
52 . . . magnetic pole serving as magnetic shield layer
53 . . . coil
54 . . . magnetoresistive device
55 . . . conductive layer
56 . . . magnetic shield layer
57 . . . slider substrate
61 . . . signal sensing region of a magnetic sensor
62 . . . gap layer
63 . . . buffer layer
64 . . . first magnetic layer
65 . . . intermediate layer
66 . . . second magnetic layer
67 . . . anti-ferromagnetic alloy layer
68 . . . tapered portion
69 . . . permanent magnet layer
70 . . . electrode
71 . . . intermediate layer
72 . . . magnetic layer

What is claimed is:

1. A magnetic recording medium having, on a substrate, a seed layer comprising an amorphous alloy or microcrystal alloy containing Ni, Ta and Zr formed on the substrate, an underlayer comprising one of Cr and a Cr alloy formed on the seed layer, and a magnetic layer formed on the underlayer,
wherein an intermediate layer comprising an alloy containing Cr and Mo is disposed between the underlayer and the magnetic layer.

2. A magnetic recording medium as defined in claim 1, wherein the seed layer containing Ni, Ta and Zr contains Ta at a concentration of 30 at % or more and 60 at % or less and Zr at a concentration of 5 at % or more and 20 at % or less.

3. A magnetic recording medium having, on a substrate, a seed layer comprising an amorphous alloy or microcrystal alloy containing Ni, Ta and Zr formed on the substrate, an underlayer comprising one of Cr and a Cr alloy constituted with crystal grains substantially of a body-centered cubic structure, with the (001) plane of the crystal grains being in parallel with the substrate and formed on the seed layer, and a magnetic layer comprising a Co alloy and having a substantially hexagonal close-packed structure formed on the underlayer,
wherein an intermediate layer comprising an alloy containing Cr and Mo is disposed between the underlayer and the magnetic layer.

4. A magnetic recording medium having, on a substrate, a seed layer comprising an amorphous alloy or microcrystal alloy containing Ni, Ta and Zr formed on the substrate, an underlayer comprising one of Cr and a Cr alloy formed on the seed layer, and a magnetic layer formed on the underlayer,
wherein the seed layer containing Ni, Ta and Zr contains Ta at a concentration of 30 at % or more and 60 at % or less and Zr at a concentration of 5 at % or more and 20 at % or less.

5. A magnetic recording medium having, on a substrate, a seed layer comprising an amorphous alloy or microcrystal alloy containing Ni, Ta and Zr formed on the substrate, an underlayer comprising one of Cr and a Cr alloy constituted with crystal grains substantially of a body-centered cubic structure, with the (001) plane of the crystal grains being in parallel with the substrate and formed on the seed layer, and a magnetic layer comprising a Co alloy and having a substantially hexagonal close-packed structure formed on the underlayer,
wherein the seed layer containing Ni, Ta and Zr contains Ta at a concentration of 30 at % or more and 60 at % or less and Zr at a concentration of 5 at % or more and 20 at % or less.

6. A magnetic recording medium having, on a substrate, a seed layer comprising an amorphous alloy or microcrystal alloy containing Ni, Ta and Zr formed on the substrate, an underlayer comprising Cr and Ti, constituted with crystal grains substantially of a body centered cubic structure, with the (001) plane of the crystal grains being in parallel with the substrate and formed on the seed layer, a first magnetic layer comprising Co, Cr and Pt having a substantially hexagonal close-packed structure formed on the underlayer and a second magnetic layer comprising Co, Cr, Pt and Ta or B having a substantially hexagonal close-packed structure formed on the first magnetic layer.

7. A magnetic recording medium having, on a substrate, a seed layer comprising an amorphous alloy or microcrystal alloy containing Ni, Ta and Zr formed on the substrate, an underlayer comprising Cr and Ti, constituted with crystal grains substantially of a body-centered cubic structure, with the (001) plane of the crystal grains being parallel with the substrate and formed on the seed layer, an intermediate layer containing Cr and Mo formed on the underlayer, and a magnetic layer comprising a Co, Cr, Pt and Ta or B, having a substantially hexagonal close-packed structure formed on the intermediate layer.

8. A magnetic recording medium as defined in claim 6, wherein the seed layer containing Ni, Ta and Zr contains Ta at a concentration of 30 at % or more and 60 at % or less and Zr at a concentration of 5 at % or more and 20 at % or less.

9. A magnetic recording medium as defined in claim 7, wherein the seed layer containing Ni, Ta and Zr contains Ta at a concentration of 30 at % or more and 60 at % or less and Zr at a concentration of 5 at % or more and 20 at % or less.

10. A magnetic storage apparatus including a magnetic recording medium having, on a substrate, a seed layer comprising an amorphous alloy or microcrystal alloy containing Ni, Ta and Zr formed on the substrate, an underlayer comprising one of Cr and a Cr alloy constituted with crystal grains substantially of a body-centered cubic structure, with the (001) plane of the crystal grains being in parallel with the substrate formed on the seed layer, and a magnetic layer comprising a Co alloy as a main component having a substantially hexagonal close-packed structure formed on the underlayer, a driver for rotationally driving the magnetic recording medium, a magnetic head having a recording section and a reproducing section constituted with a magnetoresistive head, and a unit for moving the magnetic head relative to the magnetic recording medium, wherein an intermediate layer comprising an alloy containing Cr and Mo is disposed between the underlayer and the magnetic layer.

11. A magnetic storage apparatus as defined in claim 10, wherein the seed layer containing Ni, Ta and Zr contains Ta at a concentration of 30 at % or more and 60 at % or less and Zr at a concentration of 5 at % or more and 20 at % or less.

12. A magnetic storage apparatus including a magnetic recording medium having, on a substrate, a seed layer comprising an amorphous alloy or microcrystal alloy containing Ni, Ta and Zr formed on the substrate, an underlayer comprising one of Cr and a Cr alloy constituted with crystal grains substantially of a body-centered cubic structure, with the (001) plane of the crystal grains being in parallel with the substrate formed on the seed layer, and a magnetic layer comprising a Co alloy as a main component having a substantially hexagonal close-packed structure formed on the underlayer, a driver for rotationally driving the magnetic recording medium, a magnetic head having a recording section and a reproducing section constituted with a magnetoresistive head, and a unit for moving the magnetic head relative to the magnetic recording medium, wherein the seed layer containing Ni, Ta and Zr contains Ta at a concentration of 30 at % or more and 60 at % or less and Zr at a concentration of 5 at % or more and 20 at % or less.

* * * * *